United States Patent
Zhou et al.

(10) Patent No.: US 9,887,733 B2
(45) Date of Patent: Feb. 6, 2018

(54) CALIBRATION FOR ECHO CANCELLATION IN A FULL DUPLEX COMMUNICATION SYSTEM

(71) Applicant: Lattice Semiconductor Corporation, Portland, OR (US)

(72) Inventors: Kai Zhou, Shanghai (CN); Shinje Tahk, Sunnyvale, CA (US); Kai Lei, Shanghai (CN); Qiming Wu, Shanghai (CN); Gijung Ahn, San Jose, CA (US); Min-Kyu Kim, Sunnyvale, CA (US); Fei Song, Shanghai (CN); Kexin Luo, Shanghai (CN)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 15/582,371

(22) Filed: Apr. 28, 2017

(65) Prior Publication Data

US 2017/0237464 A1 Aug. 17, 2017

Related U.S. Application Data

(63) Continuation of application No. 14/440,589, filed as application No. PCT/CN2014/086378 on Sep. 12, 2014, now Pat. No. 9,673,959.

(51) Int. Cl.
*H04L 5/14* (2006.01)
*H04B 3/23* (2006.01)
*H04L 5/00* (2006.01)

(52) U.S. Cl.
CPC .......... *H04B 3/232* (2013.01); *H04L 5/0091* (2013.01); *H04L 5/14* (2013.01)

(58) Field of Classification Search
CPC .......... H04B 3/232; H04B 7/015; H04B 3/23; H04L 5/0091; H04L 5/14; H04L 25/4904
See application file for complete search history.

(56) References Cited

U.S. PATENT DOCUMENTS

| | | | |
|---|---|---|---|
| 6,567,649 B2 | 5/2003 | Souissi | |
| 6,700,977 B2 | 3/2004 | Sugiyama | |
| 6,738,482 B1 | 5/2004 | Jaber | |
| 8,935,125 B1 * | 1/2015 | Fu | H04L 25/03343 702/181 |
| 8,958,497 B2 * | 2/2015 | Lee | H04B 7/015 375/285 |
| 2007/0091873 A1 * | 4/2007 | LeBlanc | H04B 3/23 370/352 |
| 2013/0329828 A1 | 12/2013 | Lee et al. | |

FOREIGN PATENT DOCUMENTS

| | | |
|---|---|---|
| CN | 1868136 A | 11/2006 |
| CN | 101488800 A | 7/2009 |

OTHER PUBLICATIONS

PCT International Search Report and Written Opinion, PCT Application No. PCT/CN2014/086378, dated Jun. 24, 2015, 11 pages.

* cited by examiner

Primary Examiner — Thai Nguyen
(74) Attorney, Agent, or Firm — Fenwick & West LLP

(57) ABSTRACT

A method that calibrates a device for echo cancellation and a device with calibration for echo cancellation are provided. Devices may be calibrated such that the echo residual error is less than a threshold determined by the calibration accuracy. Non-ideal factors such as mismatch may be eliminated during calibration.

5 Claims, 7 Drawing Sheets

CALIBRATION FOR ECHO CANCELLATION IN A FULL DUPLEX COMMUNICATION SYSTEM

CROSS-REFERENCE TO RELATED APPLICATIONS

This application is a continuation of and claims the benefit of U.S. application Ser. No. 14/440,589, "Calibration for Echo Cancellation in a Full Duplex Communication System," filed May 4, 2015, which claims the benefit of PCT Application Ser. No. PCT/CN2014/086378, "Calibration for Echo Cancellation in a Full Duplex Communication System," filed Sep. 12, 2014, each of which is incorporated herein by reference in its entirety.

BACKGROUND

1. Field of the Disclosure

This disclosure pertains in general to full duplex communication systems, and more specifically to echo cancellation in full duplex communication systems.

2. Description of the Related Art

Full duplex communication system allows communication between devices in both directions simultaneously. Data is transmitted in both directions on a signal carrier coupling the devices at the same time. Echo cancellation may be used to prevent echo from travelling across a full duplex communication system. By using echo cancellation techniques, an echo signal, which may be a delayed copy of an original signal, may be identified and removed from the original signal that is sent or received by one or both of the devices. Nevertheless, echo cancellation residual error may exist due to loading difference, termination and process random mismatch, especially in high speed full-duplex communication systems. The echo cancellation residual error interferes with signals in the full duplex communication system as it modifies the amplitude and/or the timing of the signals sent and received by devices. Intersymbol interference may result and the performance of the full duplex communication system may be limited.

As a result, there is a need for better solutions to calibrate devices with echo cancellation to eliminate echo cancellation residual error.

SUMMARY

Embodiments of the present disclosure are related to a method that calibrates a device for echo cancellation and a device with calibration for echo cancellation. Devices may be calibrated such that the echo residual error is less than a threshold determined by the calibration accuracy. Non-ideal factors such as mismatch may be eliminated during calibration.

In one implementation, calibration is performed differently for devices on the source side and devices on the sink side in a full-duplex system. On the source side, a device includes a driver, a replica driver, and a calibration module. The replica driver is used to cancel echo of the signal produced by the driver, so the replica driver should be calibrated to replicate the original driver behavior. During calibration, the calibration module may adjust the replica driver such that the difference between the outputs of the driver and the replica driver is within a predetermined range. By adjusting the replica driver's output for multiple iterations, the calibration module records the replica driver's output value every time when the difference is within a predetermined range, for example, when the replica driver's output crosses the driver's output. The replica driver is calibrated so that its final output is configured to be the average of the recorded values, thus replicating the behavior of the driver.

On the sink side, a device includes a driver, a replica driver, a clock recovery module, an offset module, and a calibration module. During calibration, the clock signal is recovered from the source side by the clock recovery module, and a DC offset signal is provided by the offset module to compensate for the received clock signal. Similar to the source side, the calibration module adjusts the replica driver's output for multiple iterations and records the replica driver's output value every time when the replica driver's output is detected to cross the driver's output. The replica driver is calibrated so that its final output is configured to be the average of the recorded values, thus replicating the behavior of the driver.

In one implementation, a device includes a driver, a replica driver, an echo cancellation module, an oscillator, a calibration module that includes an amplitude calibration module, a transition time calibration module, a DAC, and a comparator. During calibration, the calibration module may calibrate the replica driver by adjusting the amplitude and/or the transition time of the replica driver's output linearly. The amplitude and/or the transition time when the output of the echo cancellation module is equal to a value is recorded. The replica driver's final output is configured to be the average of the recorded values.

Other aspects include components, devices, systems, improvements, methods, processes, applications and other technologies related to the foregoing.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
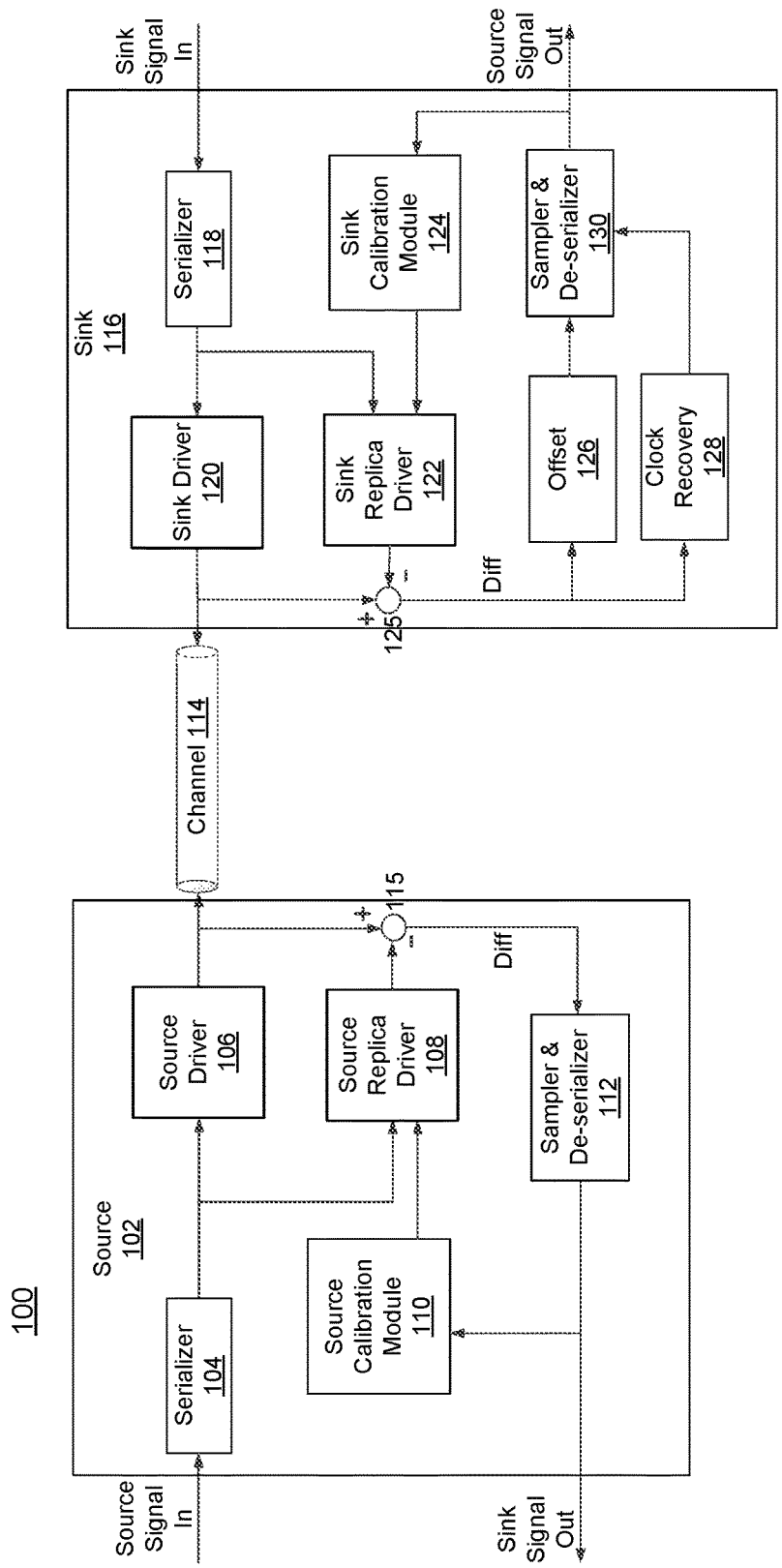
FIG. 1 is a block diagram of a full duplex system for multimedia data communications, according to one embodiment.

FIG. 1 is a block diagram of a full duplex system 100 for multimedia data communications, according to one embodiment. The full duplex system includes a source device 102 and a sink device 116 communicating via a data channel 114. Data may be exchanged between the source device 102 and the sink device 116 simultaneously via the data channel 114.

The source device 102 may provide audiovisual data. Examples of the source device 102 may include mobile phones, digital video disc (DVD) players, blu-ray players, cable boxes, internet protocol television (IPTV) boxes, laptops, or integrated circuits (IC) within such devices. The sink device 116 may receive audiovisual data, and may include functionality to display the audiovisual data. Examples of the sink devices 116 may include liquid crystal display (LCD) televisions, LCD monitors, or ICs within such devices. Audiovisual data is one example of a source signal. Other examples of a source signal may include control data or USB data.

The source device 102 includes a source driver 106, a source replica driver 108, a source calibration module 110, and a sampler 112. The source device 102 may further include a serializer 104 and the sampler 112 may include functions of a de-serializer. The sink device 116 includes a sink driver 120, a sink replica driver 122, a sink calibration module 124, an offset module 126, a clock recovery module 128, and a sampler 130. The sink device 116 may further include a serializer 118 and the sampler 130 may include additional functions of a de-serializer.

As illustrated, the source driver 106 and the sink driver 120 drive the data channel 114 simultaneously. The data channel 114 may deliver the source signal from the source device 102 to the sink device 116. At the same time, the data channel 114 may also deliver the sink signal from the sink device 116 to the source device 102.

The source signal travels along the following signal path: input to source device, to serializer 104, to source driver 106, output by source device 102 to channel 114, received at input of sink device 116, to echo cancellation 125, to clock recovery 128, to sampler & de-serializer 130 to output of sink device 116. The sink signal travels along the following signal path: input to sink device, to serializer 118, to sink driver 120, output by sink device 116 to channel 114, received at input of source device 102, to echo cancellation 115, to sampler & de-serializer 112 to output of source device 102. In this example, the source 102 produces a clock used by both devices. Thus, the sink device 116 recovers the clock from the received source signal, and produces a sink signal synchronized to that clock.

However, this duplex communication may produce an echo. While the source signal is intended to propagate from the source driver 106 to the channel 104, it may also be diverted to the echo cancellation 115. The signal received by echo cancellation 115 is then a combination of the received sink signal and an echo of the source signal. The source replica driver 108 removes the source signal echo from the combined signal such that (ideally) only the sink signal exits the echo cancellation 115 and is output by the source device 102. Similarly, the sink replica driver 122 ideally removes the sink signal echo from the combined signal (of received source signal and echo of sink signal) such that only the source signal is output by the sink device 116. Thus, it is important that the source replica driver 108 is calibrated to have the same characteristics (e.g., amplitude, transition time, etc.) as the source driver 106 in order to adequately cancel the source signal echo, and that the sink replica driver 122 is calibrated to have the same characteristics as the sink driver 120.

The source device 102 and the sink device 116 may be calibrated before normal operations. The source calibration module 110 may calibrate the source replica driver 108 to ensure the source echo residue is below a threshold. That is, the source calibration module 110 may calibrate the source replica driver 108 such that the difference between output signals of the source driver 106 and the source replica driver 108 is below a threshold. The sink calibration module 124 may calibrate the sink replica driver 122 to ensure the sink echo residue is less than a threshold. The sink calibration module 124 may calibrate the sink replica driver 122 such that the difference between the output signals of the sink driver 120 and the sink replica driver 122 is below a threshold. The source calibration module 110, the sink calibration module 124, and the offset module 126 may operate only during calibration.

When calibrating, the sink device 116 may need to recover a clock from the source side. As illustrated, the clock recovery module 128 may include a multiplexer (not shown) that keeps the clock signal during calibration. In addition, the offset module 126 may provide a DC offset signal to a difference signal. The offset module 126 may include a digital-to-analog converter (DAC) (not shown). In the illustrated example, the clock recovery module recovers the clock signal by using the difference signal. In other implementations, the clock signal may be recovered by using the output of the offset module 126.

Figure 2:
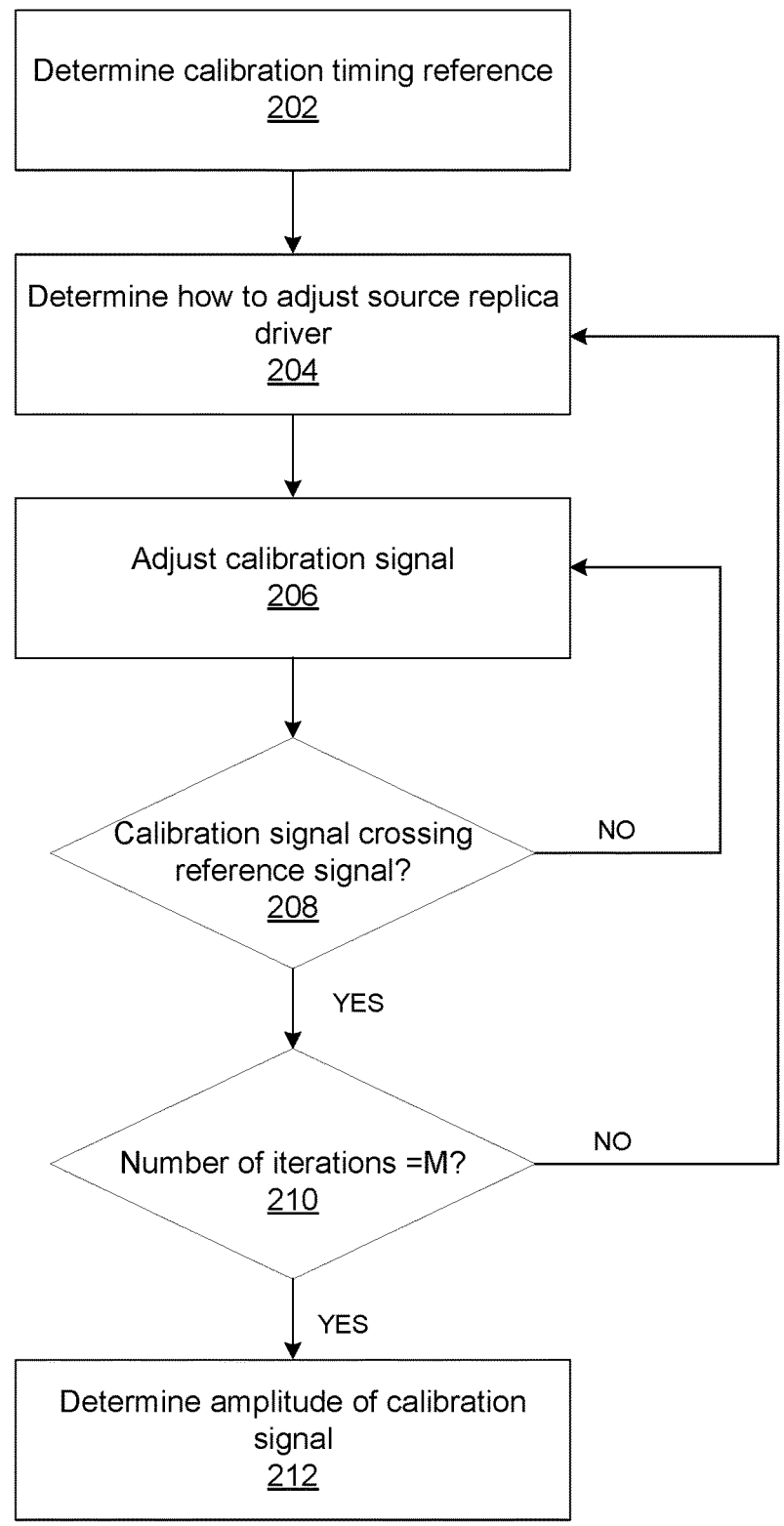
FIG. 2 is a flow diagram of an example method of calibrating a source replica driver, suitable for use in the source device of FIG. 1.
Figure 3:
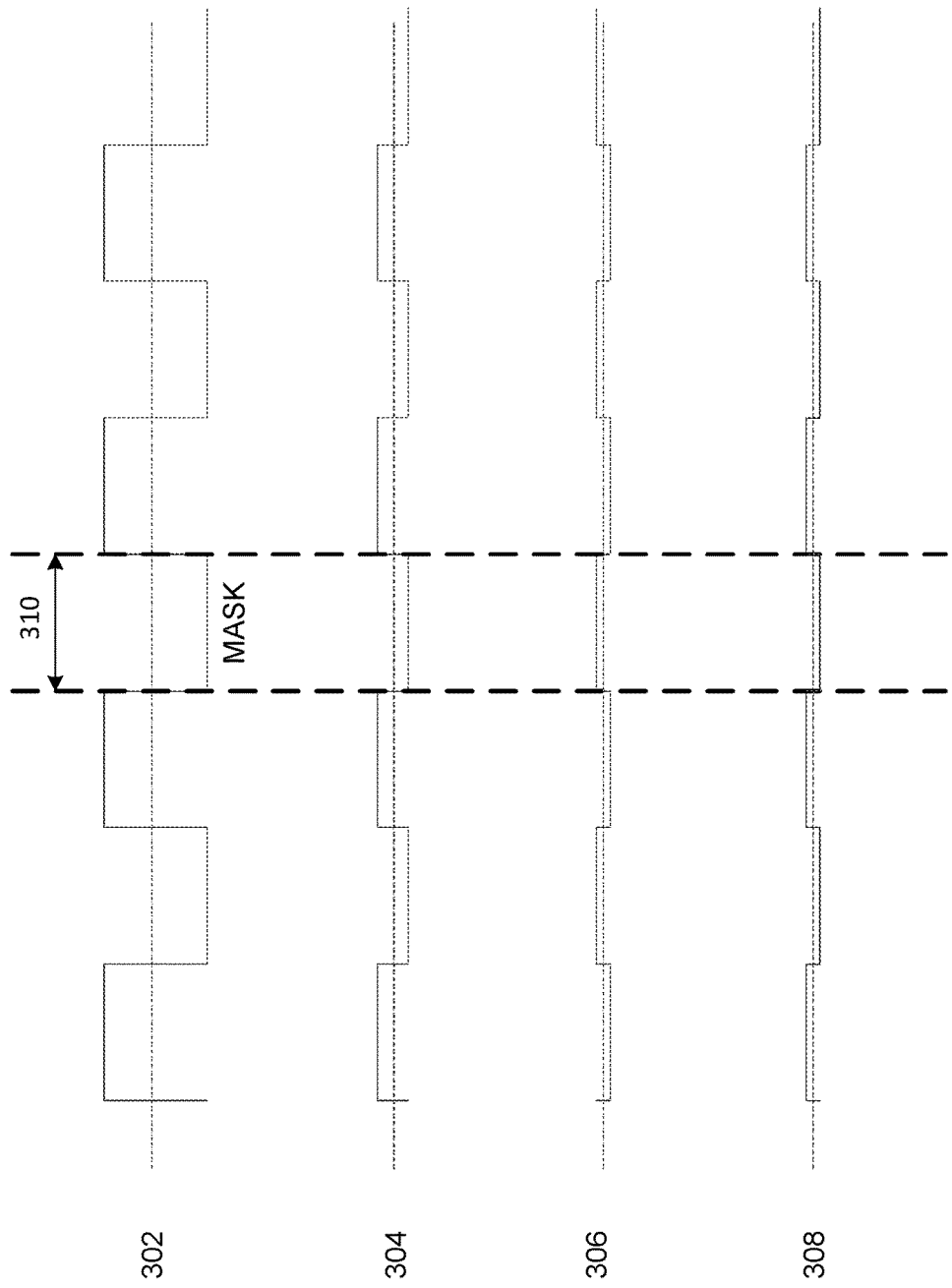
FIG. 3 illustrates example source side calibration waveforms.

FIG. 2 is a flow diagram of an example method of calibrating a source replica driver, suitable for use in the source device 102 of FIG. 1. FIG. 2 is discussed in connection with FIG. 3. FIG. 3 illustrates example source side calibration waveforms. In FIG. 3, the dashed line is the zero level.

At block 202, a calibration timing reference is determined. The source calibration module 110 may enable the source driver 102 and disable the source replica driver 108 (i.e., echo cancellation is turned off). A clock signal is used as the source signal, and the source driver then generates a clock signal 302. Since the source replica driver is disabled, no echo cancellation occurs and the sampler 112 receives the clock signal 302. The clock signal 302 has a frequency F0 and may be sampled by a sampling frequency of F1. The oversampling rate K is F1/F0. The source calibration module 110 may detect a quantity of consecutive values (e.g., one (1), zero (0)) of the sampled version of the clock signal 302 in a duration thereby determining the clock timing information. In some implementations, the K/2 number of consecutive ones (1) or zeros (0) may be used as the calibration timing reference. For example, as illustrated in FIG. 3, the K/2 number of consecutive zeros in one clock cycle is used as a mask and the corresponding duration is the masked area 310. The masked area 310 is the time period that will be used for calibration purposes. In this example, calibration occurs based on samples taken during the clock low time period.

The source replica driver 108 is then enabled to generate a calibration signal after the calibration timing reference is determined. At block 204, a source calibration module 110 determines how to adjust the source replica driver 108 so that the outputs of the source driver 106 and source replica driver 108 are the same and the resulting difference signal from echo cancellation 115 is zero. The source calibration module 110 may compare the amplitude of the calibration signal generated by the source replica driver 108 to the amplitude of the reference signal generated by the source driver 106, for example by observing the difference signal during the mask period 310. The amplitude of the calibration signal may be greater than, equal to, or less than the amplitude of the reference signal generated by the source driver. During calibration, the amplitude of the calibration signal is increased when the amplitude of the calibration signal is less than the amplitude of the reference signal, and is decreased when it is greater than the amplitude of the reference signal.

The source calibration module 110 may analyze a difference signal between the calibration signal and the reference signal to determine how to adjust the source replica driver 108. In some implementations, the difference signal is analyzed by evaluating the quantity of consecutive values (e.g., one (1), zero (0)) of the sampled difference signal, for example during the mask period 310. In some implementations, the difference signal is analyzed by evaluating the edges (e.g., a falling edge, a rising edge) of the sampled difference signal.

The difference signal may be sampled by the sampling frequency K1, and the quantity (N) of consecutive values (e.g., one (1), zero (0)) in a duration (e.g., the masked area) is determined. The amplitude of the difference signal is compared to a threshold amplitude by comparing this quantity to a threshold number. In some implementations, the quantity (N) of the consecutive values (e.g., one (1), zero (0)) may be compared to two thresholds, th_h1 and th_l1, and the adjustment decision may be made based on this comparison. When the number N is less than the threshold, th_l1, the source calibration module 110 determines to increase the amplitude of the calibration signal. When the number N is equal to or greater than the threshold, th_h1, the source calibration module determines to decrease the amplitude of the calibration signal. As such, the amplitude of the difference signal is ensured to be within a predetermined range.

For example, as illustrated in FIG. 3, during the masked area 310, the number (N) of ones of the sampled difference signal 304 is less than the threshold th_h1, indicating the amplitude of the calibration signal is less than the amplitude of the reference signal. The source calibration module 110 determines that the amplitude of the calibration signal needs to be increased. At block 206, the source replica driver may be adjusted according to the adjustment determination made at block 204. In one implementation, the threshold th_l1 is equal to the threshold th_h1.

The source replica driver may be adjusted until the calibration signal crosses the reference signal determined by the calibration module at block 208. At a time point, the calibration signal crosses the reference signal when the amplitudes are equal or a difference between the amplitudes is within a predetermined range. The source calibration module 110 may determine the calibration signal crosses the reference signal when a quantity of consecutive values (e.g., one (1), zero (0)) is within a predetermined range (th_l1, th_h1). The predetermined range is externally configurable. In some implementations, at block 208, the calibration module may make this determination by analyzing the edges (e.g., a rising edge, a falling edge) of the difference signal.

The amplitude of the calibration signal may be increased until the quantity of the consecutive values (e.g., one (1), zero (0)) is equal to or greater than the threshold, th_h1, and be decreased until the quantity of the consecutive values (e.g., one (1), zero (0)) is less than the threshold, th_l1. For example, as illustrated in FIG. 3, the source calibration module 110 adjusts the calibration signal by increasing its amplitude after determining the number of ones of the difference signal 304 is less than the threshold th_l1. The amplitude of the calibration signal is increased until the number of ones of the difference signal 306 is determined to be equal to the threshold th_h1, when the calibration module starts to adjust the calibration signal by reducing its amplitude. The amplitude of the calibration signal is decreased until the number of ones of the difference signal 308 is determined to be less than the threshold th_l1.

During calibration, the calibration module 110 adjusts the source replica driver 108 for multiple (M) iterations. The number of iterations is externally configurable. The calibration module 110 records the calibration of the source replica driver 108 (e.g., by recording the amplitude of the calibration signal) each time when the calibration signal crosses the reference signal, as $D_0, D_1, \ldots$ or $D_{M-1}$. At block 210, the calibration module determines if the source replica driver has been adjusted for M iterations. The calibration module stops adjusting the calibration signal when the number of iterations has reached M. At block 212, the amplitude of the calibration signal is determined to be the average of the amplitudes $D_0, D_1, \ldots$ and $D_{M-1}$.

Figure 4:
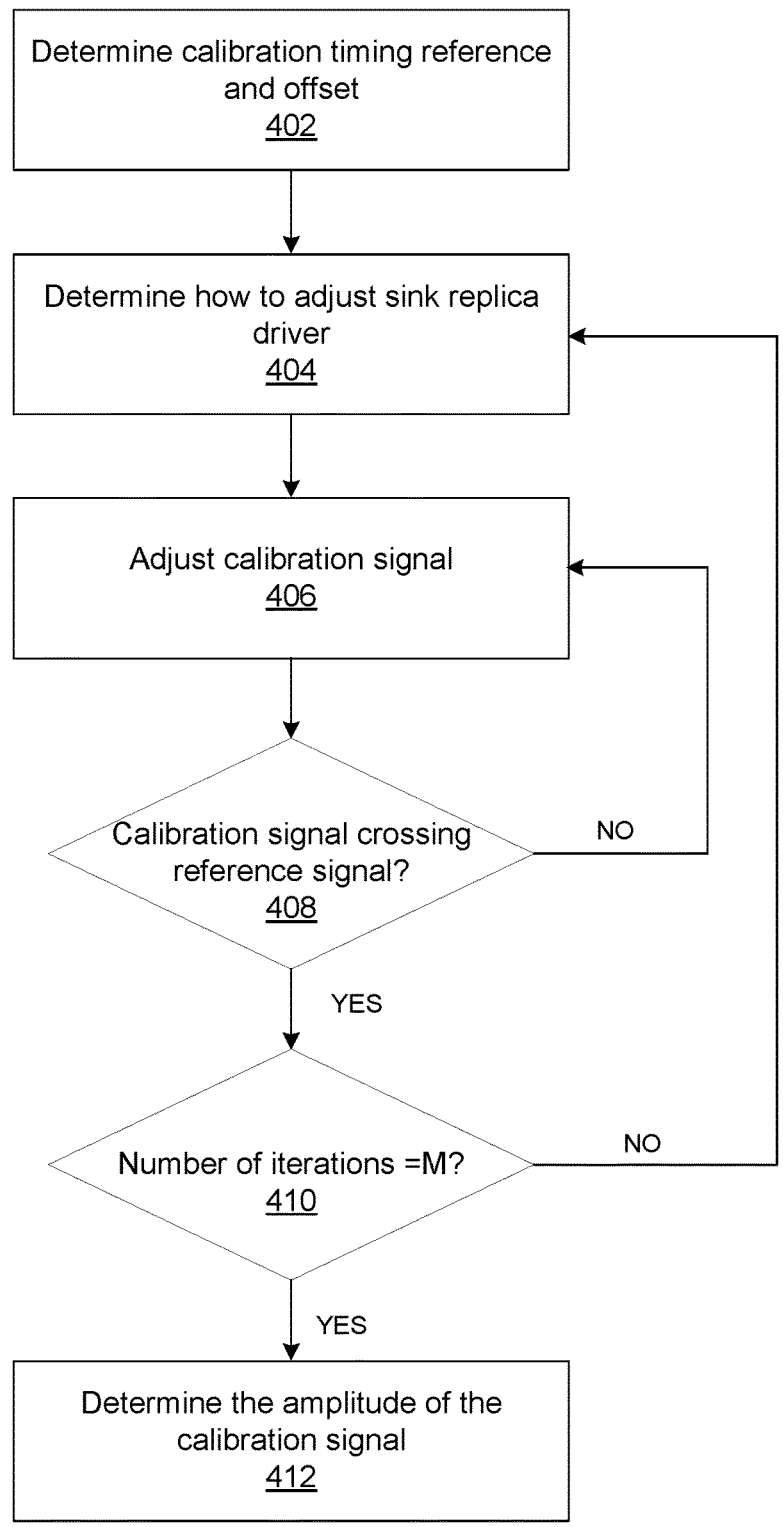
FIG. 4 is a flow diagram of an example method of calibrating a sink replica driver, suitable for use in the device of FIG. 1.
Figure 5:
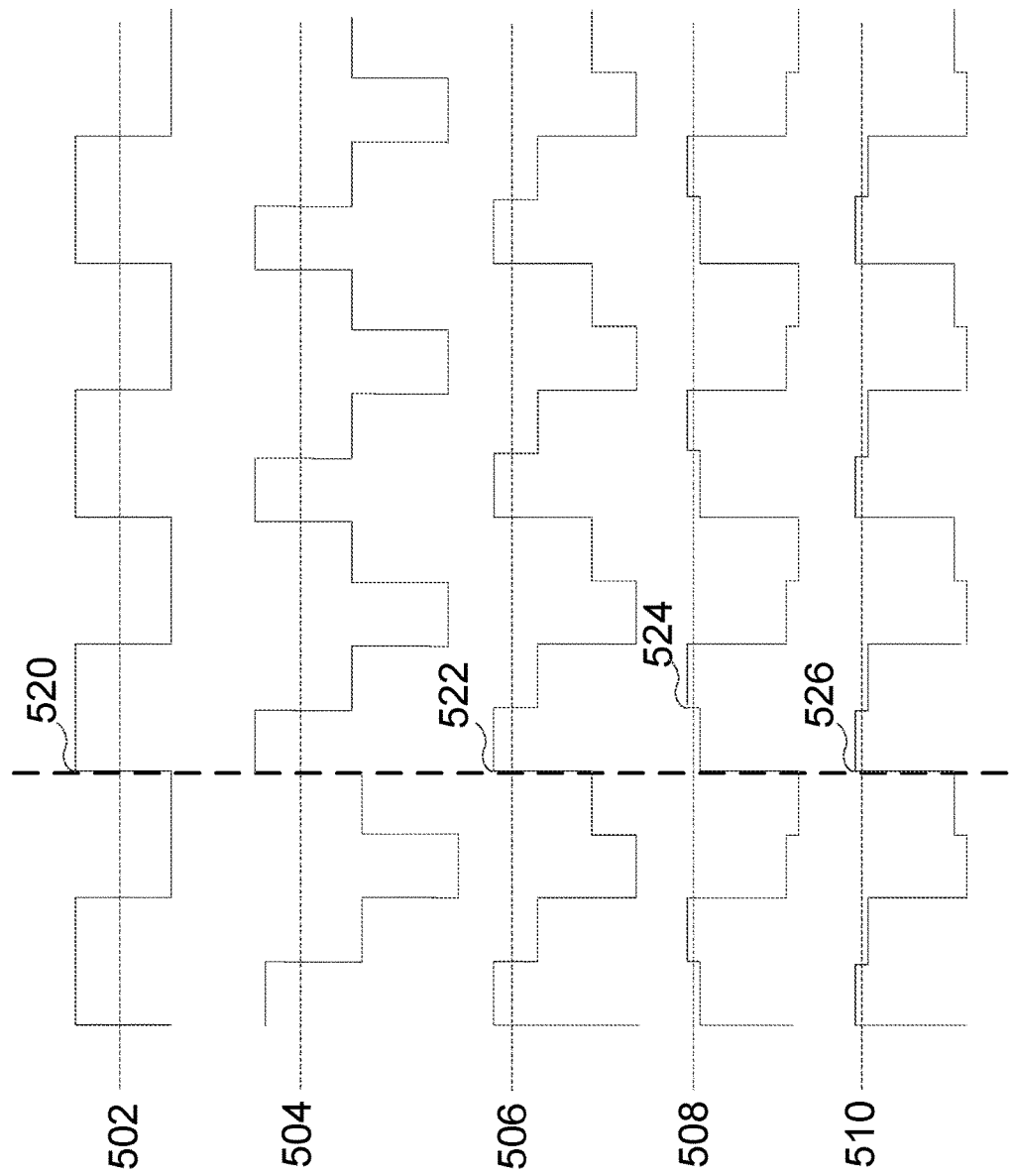
FIG. 5 illustrates example sink side calibration waveforms.

FIG. 4 is a flow diagram of an example method of calibrating a sink replica driver, suitable for use in the device of FIG. 1. FIG. 4 is discussed in connection with FIG. 5. FIG. 5 illustrates example sink side calibration waveforms. The sink side calibration is different from the source side calibration in the following respect. During source side calibration, there is no received sink signal, so calibration can be used based on only the source signal. However, because the sink side uses a clock from the source side, during sink side calibration, there will be a received source signal (e.g., the clock) that is accounted for.

In some implementations, the sink calibration module 124 calibrates the sink replica driver 122 when edges of the incoming clock signal from the source side overlap with edges of the sink signal sent by the sink driver 120. Similar to the source side calibration as described with respect to FIG. 2, at block 402, a calibration timing reference is determined. The sink driver 120 and the sink replica driver 122 are disabled, when a clock signal is received from the source side. The clock signal has a frequency F0 and may be sampled by a sampling frequency F1. The oversampling rate K is F1/F0. The sink calibration module 124 may detect a quantity of consecutive values (e.g., one (1), zero (0)) in the sampled clock signal thereby determining the clock timing information. In some implementations, the K/2 number of consecutive ones (1) or zeros (0) may be used as the calibration timing reference. In various implementations, a multiplexer may be set to ensure that the recovered clock comes from a clock path.

At block 402, a DC offset for calibrating the sink replica driver is determined. This DC offset value may be determined as half of the amplitude of the clock signal provided by the source side, Ain/2. The DC offset value may be determined by adjusting the output of the offset module and evaluating the incoming clock signal with offset. When the quantity of consecutive ones (1) of the sampled incoming clock signal with offset in a clock cycle is zero, the DC offset value is the amplitude Ain of the incoming clock signal. The clock signal from the source side is used to time the sink signal. However, it preferably should be zero when calibrating the echo cancellation between the sink driver 120 and sink replica driver 122. The DC offset may be used to achieve this effect.

At block 404, how to adjust the sink calibration module is determined. A sink side clock is used as the sink signal. Amplitudes of the calibration signal from the sink replica driver 122 and the reference signal from the sink driver 120 may be compared, for example by considering the difference signal generated by echo cancellation 125, to determine if the amplitude of the calibration signal needs to be increased or decreased. The amplitude of the calibration signal should be increased if it is less than the amplitude of the reference signal, and decreased if it is greater than the amplitude of the reference signal. The sink calibration module 124 may analyze a difference signal between the calibration signal and the reference signal to determine how to adjust the sink replica driver 122. In some implementations, the difference signal is analyzed by evaluating the quantity of consecutive values (e.g., one (1), zero (0)) of the sample difference signal. The amplitude needs to be increased when the quantity is less than a threshold th_l2 and decreased when the quantity is greater than or equal to a threshold th_h2.

At block 406, the sink calibration module 124 adjusts the amplitude of the calibration signal according to the determination made at block 404. The amplitude of the sink calibration signal is adjusted until the calibration signal crosses the reference signal, which is determined at block 408. The calibration signal crosses the reference signal when their amplitudes are equal or the difference between the amplitudes is within a predetermined range. The sink calibration module may determine the calibration signal crosses the reference signal when the quantity of consecutive ones or zeros of the sampled difference signal is within a predetermined range (th_l2, th_h2).

The amplitude of the sink calibration signal is decreased until the quantity of the consecutive ones or zeros is less than the threshold th_l2, or increased until the quantity of the consecutive ones or zeros is greater than or equal to the threshold th_h2. In one implementation, the threshold th_l1 is equal to the threshold th_h1. Each time when the calibration signal crosses the reference signal, the calibration of the sink replica driver 122 is recorded (e.g., by recording the amplitude of the calibration signal). Such calibration may be performed for multiple (M) iterations and the sink calibration module 124 determines if calibration has been performed for M iterations, at block 410. The calibration stops when the number of iterations reaches M. The amplitude of the calibration signal is determined by averaging the amplitudes recorded.

The approach described above is similar to the one previously described for source side calibration. The sink side calibration waveforms are similar to those shown in FIG. 3 for the source side. The effect of the clock signal from the source device is eliminated by the DC offset. Without the DC offset, the clock signal from the source device switches between +Ain/2 and −Ain/2. With the DC offset, the clock signal switches between −Ain and 0. The calibration is performed during the time periods when the clock signal is 0.

In an alternate approach, the sink calibration module 124 calibrates the sink replica driver 122 using edges of the incoming clock signal. At block 402, a calibration timing reference is determined. The sink driver 120 and the sink replica driver 122 are disabled, and a clock signal 502 is received from the source side. The clock signal has a frequency F0 and may be sampled by a sampling frequency F1. The oversampling rate K is F1/F0. The sink calibration module 124 may mark edges (a rising edge, a falling edge) of the sampled clock signal. For example, the rising edge 520 of the clock signal 502 is marked as the reference phase. In various implementations, a multiplexer may be set to ensure that the recovered clock comes from a clock path.

At block 402, a DC offset for calibrating the sink replica driver is determined. This DC offset value may be determined as half of the amplitude Ain of the clock signal provided by the source side. The DC offset value may be determined by adjusting the output of the offset module 126 and evaluating the incoming clock signal with offset. When the quantity of consecutive ones (1) of the sampled incoming clock signal with offset in a clock cycle is zero, the DC offset value is the amplitude Ain of the incoming clock signal.

In this alternate approach, to avoid edge overlapping of the clock signal from the source and the clock signal from the sink (which will be used for calibration), the phase of the reference signal of the sink driver may be adjusted in reference to the incoming clock signal. A DC signal with an amplitude that equals to half of the amplitude of the default output of the sink driver is added to the sink side. The sink driver 120 generates a sink clock signal at frequency F0 (the sink replica driver 122 is disabled) and the phase alignment is determined in reference to the incoming clock signal. The sink clock signal is adjusted such that the phase difference between the sink clock signal and the incoming clock signal is 90 degrees. The combined clock signal of the incoming clock signal and the source clock signal has a frequency F0 and is sampled by a sampling frequency F1. The sink calibration module 124 may determine the quantity of consecutive values (e.g., one (1), zero (0)) in one clock cycle. The sink clock signal may be adjusted by detecting the quantity (N3) of ones of the sampled combined signal. The phase of the sink clock signal may be adjusted until when the number N3 of ones in one clock cycle is equal to K/4, such as the combined signal 504 illustrated in FIG. 5. The phase offset may be adjusted by using a serializer.

At block 404, how to adjust the sink replica driver 122 is determined. A DC signal with an amplitude of the DC offset determined at step 402 is added on the sink side. Amplitudes of the calibration signal and the reference signal may be compared to determine if the amplitude of the calibration signal needs to be increased or decreased. The amplitude of the calibration signal should be increased if it is less than the amplitude of the reference signal, and the amplitude of the calibration signal should be decreased if it is greater than the amplitude of the reference signal. The sink calibration module 124 may analyze a signal to determine how to adjust the sink replica driver 122. The analyzed signal is the combined signal of the incoming clock signal and the difference between the calibration signal and the reference signal and further including the DC offset. In some implementations, the phase difference between this combined signal and a reference phase may be compared to thresholds. For example, the duration between a rising edge of the combined signal and a reference rising edge may be compare to a threshold th_p to if the amplitude of the calibration signal needs to be increased or decreased.

For example, the signal 506 is the combined signal where the amplitude of the calibration signal is less than the amplitude of the reference signal. The phase difference between the rising edge 522 of the combined signal 506 and the rising edge 520 of the reference signal is compared to a threshold to determine how to adjust the amplitude of the calibration signal. The rising edge in this example is defined as the rising edge when the signal crosses zero. The zero level is shown by the dashed lines in FIG. 5. The sink calibration module 124 determines that the amplitude of the calibration signal needs to be increased because the phase difference of the combined signal 506 is zero, which is less than a threshold. In contrast, the signal 508 is the combined signal where the amplitude of the calibration signal is greater than the amplitude of the reference signal. The phase difference between the rising edge 524 of the combined signal 508 and the rising edge 520 of the reference signal is ninety degrees.

At block 406, the amplitude of the calibration signal of the sink replica driver 122 is adjusted according to the determination made at block 404. The amplitude of the calibration signal is adjusted until the calibration signal crosses the reference signal, as determined by the sink calibration module 124 at block 408. In some implementations, the amplitude of the calibration signal is decreased until the measured phase difference is less than or equal to a threshold, and is increased until the phase difference is greater than a threshold. For example, the amplitude of the calibration signal is decreased until the phase difference of the combined signal 508 is determined to be equal to the threshold, and then increased until the phase difference of the combined signal 510 is determined to be less than the threshold.

The amplitude of the calibration signal is recorded each time when the calibration signal crosses the reference signal. Such calibration may be performed for multiple (M) iterations and the sink calibration module 124 determines if calibration has been performed for M iterations, at block 410. The calibration stops when the calibration iteration reaches a predetermined number. The amplitude of the calibration signal by the sink replica driver 122 is determined by averaging the amplitudes recorded.

The residual error on the source side and on the sink side may be determined. The number (M) of iterations as well as the thresholds used to determine whether a calibration signal crosses a reference signal may be adjusted according to the residual error. For example, the number of iterations may be increased upon determining the residual error is above a desired range. For the source side, the max residual error after the calibration may be determined according to Equation (1):

$$A_{re\_source} = A_{sa\_source} + A_{os\_source} + A_{lsb\_dr\_source} \quad (1),$$

where $A_{re\_source}$ denotes the worst case remaining amplitude mismatch on the source side after calibration; $A_{sa\_source}$ is the source side sampler sensitivity, $A_{os\_source}$ is the equivalent offset voltage of the signal path and sampler on the source side, and $A_{lsb\_dr\_source}$ is the minimum configured output amplitude step of the source replica driver. The sink side calibration error may be determined according to Equations (2) and (3) when the resolution of the digital to analog converter is no more than the minimum configured output amplitude step of the sink replica driver or more than the minimum configured output amplitude step of the sink replica driver, respectively:

$$A_{re\_sink} = A_{sa\_sink} + A_{os\_sink} + A_{lsb\_dr\_sink} + A_{lsb\_dac\_sink} \quad (2),$$

$$A_{re\_sink} = A_{sa\_sink} + A_{os\_sink} + A_{lsb\_dr\_sink} \quad (3),$$

where $A_{re\_sink}$ denotes the worst case remaining amplitude mismatch on the sink side after calibration, $A_{os\_sink}$ is the equivalent offset voltage of the signal path and sampler on the sink side, $A_{lsb\_dr\_sink}$ is the minimum configured output amplitude step of the sink replica driver, and the $A_{lsb\_dac\_sink}$ is the minimum configured output amplitude step of the sink DC offset model.

Figure 6:
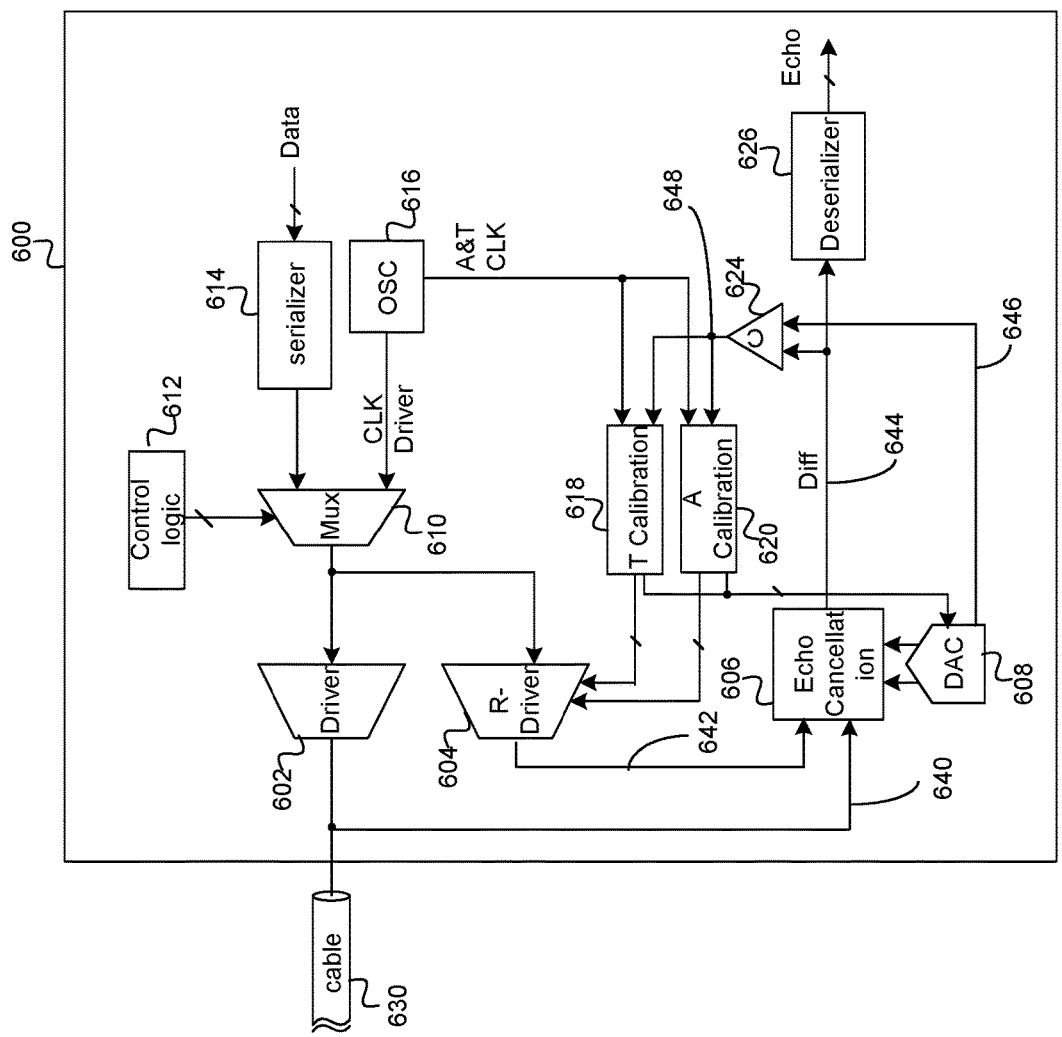
FIG. 6 illustrates a block diagram of an example device.

FIG. 6 illustrates a block diagram of an example device 600. The device 600 may be part of a source device or a sink device. The device includes a driver 602, a replica driver 604, an echo cancellation module 606, a multiplexer 610, a control logic 612, a serializer 614, an oscillator 616, a deserializer 626, and a calibration module including a transition time calibration module 618, an amplitude calibration module 620, a comparator 624, and a digital-to-analog converter (DAC) 608. During normal operations, the multiplexer 610 receives data from the serializer 614 and provides this data to the driver 602 and the replica driver 604. The driver 602 transmits serial data provided by the serializer 614 across cable 630. The replica driver 604 receives the same input as the driver 602 and its output 642 is provided to the echo cancellation module 606, of which another (unwanted) input is an echo of the driver's 602 output 640. The output of the echo cancellation module 606 is a difference signal 644 between output signals 640 and 642 of the drivers 602 and 604, respectively. This difference signal is converted by the deserializer 626 into low speed parallel data.

During calibration, the multiplexer 610 receives clock signals from the oscillator 616 and provides these clock signals to the driver 602 and the replica driver 604. The oscillator 616 also provides clock signals for the transition time calibration module 618 and the amplitude calibration module 620. The transition time calibration module 618 and the amplitude calibration module 620 calibrate the timing and the amplitude of the output 642 of the replica driver 604 such that the difference 644 is less than a threshold. The DAC 608 provides a DC voltage bias to the echo cancellation module 606. The DAC 608 outputs DC offset voltages, which may be controlled by the transition time calibration module 618 and the amplitude calibration module 620. The comparator 624 compares the difference signal 644 to a threshold 646 (e.g., the common voltage of DAC) and outputs the comparison 648 to the transition time calibration module 618 and the amplitude calibration module 620. When the amplitude is greater than or equal to the common voltage Vcom, the output 648 of the comparator 624 is one, when the amplitude is less than the common voltage Vcom, the output 648 of the comparator 624 is zero. The control logic 612 generates calibration control signals.

Figure 7:
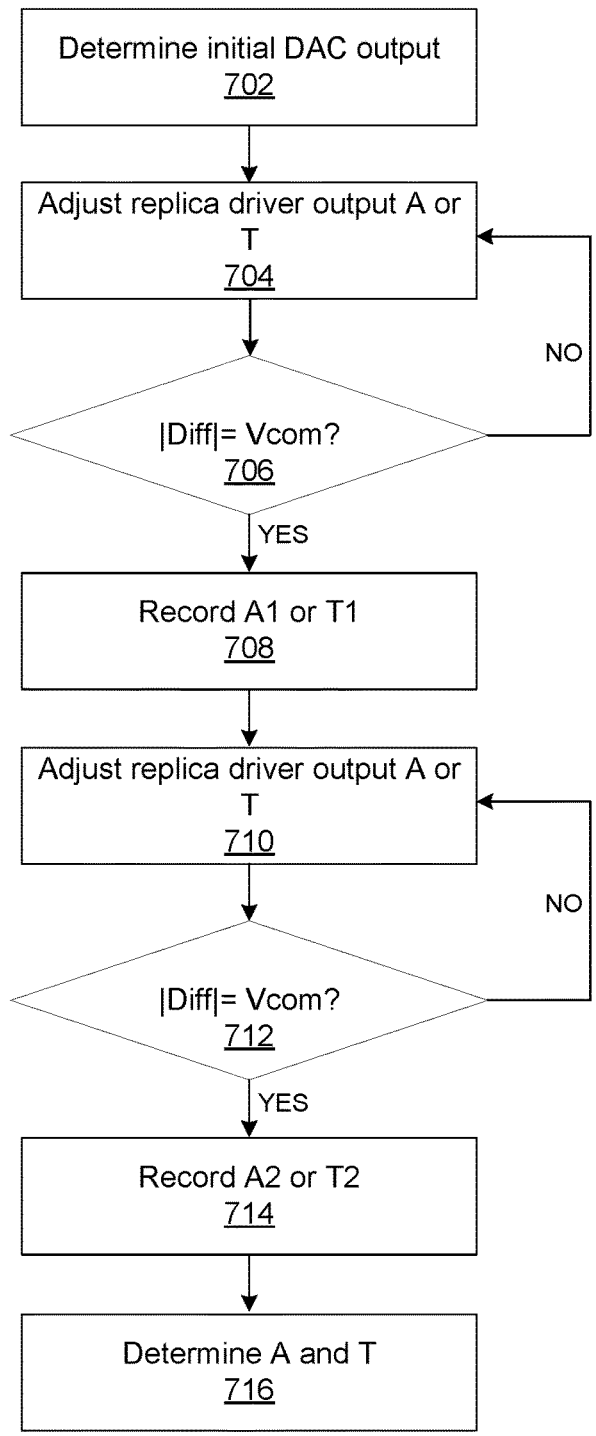
FIG. 7 illustrates a flow diagram of an example method of calibrating a replica driver, suitable for use in the device of FIG. 6.

FIG. 7 illustrates a flow diagram of an example method of calibrating a replica driver, suitable for use in the device of FIG. 6. At block 702, a calibration module (e.g., a transition time calibration module, an amplitude calibration module) may determine the initial DAC output voltages (Vcom+dV, Vcom−dV), where Vcom is the common voltage and dV is the deviation voltage. The transition time calibration module 618 and the amplitude calibration module 620 may adjust the DAC output voltages by adjusting the deviation voltage dV. At block 704, the replica driver's output is adjusted by the calibration module. The transition time calibration module 618 may adjust the transition time of the replica driver's output from an initial value to a final value linearly. The rise time and fall time of the replica driver's output signal 642 increases according to the adjustment. The amplitude calibration module 620 may adjust the amplitude of the replica driver's output from an initial value to a final value linearly. The amplitude of the replica driver's output signal 642 increases according to the adjustment.

At block 706, the difference between amplitudes of signals generated by the driver and the replica driver are compared. The amplitude of the difference signal 644 is compared to the common voltage Vcom 646 of the DAC 608 by the comparator 624. The transition time or the amplitude of the replica driver's output is adjusted until the amplitude of the difference signal is determined to be equal to the common voltage Vcom. In some implementations, the transition time calibration module 618 or the amplitude calibration module 620 detects the pattern of alternating ones and zeros at block 706. When a pattern of alternating ones and zeros disappears, the amplitude of the difference signal 644 is determined to be equal to the common voltage Vcom. At block 708, the transition time T1 or the amplitude A1, when the amplitude of the difference signal is determined to be equal to the common voltage Vcom for the first time, is recorded.

At block 710, the replica driver's output is adjusted. The transition time calibration module 618 adjusts the transition time of the replica driver's output from the recorded value T1 to a final value linearly. The amplitude calibration module 620 adjusts the amplitude of the replica driver's output from the recorded value A1 to a final value linearly. At block 712, the amplitude of the difference signal 644 is compared to the common voltage Vcom 646 of the DAC 608 by the comparator 624. The transition time or the amplitude of the replica driver's output is adjusted until the amplitude of the difference signal is determined to be equal to the common voltage Vcom. In some implementations, the transition time calibration module 618 or the amplitude calibration module 620 detects the pattern of alternating ones and zeros at block 706. When a pattern of alternating ones and zeros appears, the amplitude of the difference signal 644 is determined to be equal to the common voltage Vcom. At block 714, the transition time T2 or the amplitude A2, when the amplitude of the difference signal is determined to be equal to the common voltage Vcom for the second time, is recorded. At step 416, the transition time T and the amplitude A of the replica driver's output is determined. The transition time calibration module 618 determines the transition time T to be the average of the recorded transition times T1 and T2, and the amplitude calibration module 620 determines the amplitude to be the average of the recorded amplitudes A1 and A2. The replica driver is adjusted to a setting of which the output signal 652 has an amplitude of A and transition time of T. The replica driver is configured to use this setting during normal operations.

Upon reading this disclosure, those of skill in the art will appreciate still additional alternative designs. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A device for full duplex communication over a channel, comprising:
    a driver circuit configured to generate a reference signal;
    a replica driver circuit configured to generate a calibration signal; and
    a calibration circuit coupled to the driver circuit and the replica driver circuit and configured to:
        determine a first reference voltage,
        adjust an amplitude of the calibration signal linearly,
        record a first amplitude value and a second amplitude value of the amplitude of the calibration signal responsive to determining that a first difference between the amplitude of the calibration signal and an amplitude of the reference signal is equal to the first reference voltage, and
        determine a calibration amplitude by averaging the first amplitude and the second amplitude values.

2. The device of claim 1, wherein the calibration module circuit is further configured to:
    determine a second reference voltage,
    adjust a transition time of the calibration signal linearly,
    record a first transition time value and a second transition time value of the calibration signal responsive to determining that a second difference between the amplitude of the calibration signal and the amplitude of the reference signal is equal to the second reference voltage, and
    determine a calibration transition time by averaging the first transition time and the second transition time.

3. The device of claim 2, wherein the calibration circuit comprises a digital-to-analog converter configured to generate the first reference voltage and the second reference voltage, and a comparator circuit configured to compare the difference of the calibration signal and the reference signal to the first reference voltage or the second reference voltage.

4. The device of claim 1, wherein the calibration circuit determines that the first difference is equal to the first reference voltage responsive to detecting that a pattern of alternating zeros and ones in the first difference disappears.

5. The device of claim 2, wherein the calibration circuit determines that the second difference is equal to the second reference voltage responsive to detecting that a pattern of alternating zeros and ones in the second difference disappears.

\* \* \* \* \*